(12) United States Patent
McCall et al.

(10) Patent No.: US 7,500,405 B2
(45) Date of Patent: Mar. 10, 2009

(54) FLUID FLOW METER AND MIXER HAVING REMOVABLE AND REPLACABLE DISPLACEMENT MEMBER

(75) Inventors: Floyd McCall, Murrieta, CA (US); Joyann Gongaware, legal representative, Hemet, CA (US); Robert J. W. Peters, Linlithgow (GB)

(73) Assignee: McCrometer, Inc., Hemet, CA (US)

( * ) Notice: Subject to any disclaimer, the term of this patent is extended or adjusted under 35 U.S.C. 154(b) by 0 days.

(21) Appl. No.: 11/660,021

(22) PCT Filed: Aug. 10, 2004

(86) PCT No.: PCT/US2004/025900

§ 371 (c)(1), (2), (4) Date: Feb. 8, 2007

(87) PCT Pub. No.: WO2006/022702

PCT Pub. Date: Mar. 2, 2006

(65) Prior Publication Data

US 2008/0016968 A1    Jan. 24, 2008

(51) Int. Cl.
*G01F 1/37* (2006.01)
(52) U.S. Cl. .............. 73/861.52; 73/861.55; 73/861.58
(58) Field of Classification Search .............. 73/861.52, 73/861.55, 861.58
See application file for complete search history.

(56) References Cited

U.S. PATENT DOCUMENTS 3,167,086 A * 1/1965 Michalski ................ 137/315.2
4,637,756 A * 1/1987 Boles ...................... 405/184
4,638,672 A    1/1987 McCall ..................... 73/861.52
4,812,049 A    3/1989 McCall
4,856,344 A    8/1989 Hunt
5,363,699 A    11/1994 McCall
5,551,305 A    9/1996 Farchi et al.
5,597,961 A    1/1997 Marrelli
5,814,738 A    9/1998 Pinkerton et al. ........ 73/861.55

FOREIGN PATENT DOCUMENTS

EP              0684458        11/1995
WO          WO 9956091         11/1999

OTHER PUBLICATIONS

Performance Characteristics of an Extended Throat Flow Nozzle for the Measurement of High Void Fraction Multi-Phase Flows; J.R. Fincke; Lockheed Martin Idaho Technologies Company, Jun. 28, 1999.

* cited by examiner

*Primary Examiner*—Harshad Patel
(74) *Attorney, Agent, or Firm*—Greer, Burns & Crain, Ltd.

(57) ABSTRACT

Fluid flow apparatus, such as a fluid flow meter, a fluid mixing device or a fluid dispersing device, includes a fluid displacement member removeably mounted in a conduit and a pipe or tube extending through the wall of the conduit and having a portion extending through the displacement member to its downstream face for sensing flow conditions at the axis of the conduit downstream of the displacement member. The displacement member is removeably and replaceably mounted on the pipe or tube so that one displacement member can be replaced by one or more displacement members and thereby accommodate a very broad range of flows of various fluids, fluid suspensions and slurries.

17 Claims, 3 Drawing Sheets

FLUID FLOW METER AND MIXER HAVING REMOVABLE AND REPLACABLE DISPLACEMENT MEMBER

FIELD OF THE INVENTION

The present invention relates to fluid flow apparatus and, in particular, to fluid flow meters, fluid mixers and fluid dispersing devices.

BACKGROUND OF THE INVENTION

U.S. Pat. Nos. 4,638,672, 4,812,049, 5,363,699 and 5,814,738 disclose fluid flow meters and fluid dispersing and mixing devices which are characterized by a unique static fluid flow displacement member which is mounted symmetrically within a conduit and which is effective to linearize fluid flow through the conduit within a region defined between the displacement member and the interior surface of the conduit and to flatten the velocity profile of fluid flow in the conduit both upstream and downstream from the displacement member. The apparatus ensures reliable measurement of fluid flow conditions within the conduit and also provides for homogeneous blending and dispersing of diverse fluids and/or fluids containing particulate matter.

The unique fluid flow meters and mixers are made and sold under the registered trademark "V-CONE" by McCrometer, Inc. of Hemet, Calif., which is the owner of the above patents and the assignee of the present invention.

The fluid flow displacement member in the V-CONE devices is comprised of two frustums, usually conical, joined at their larger ends and mounted coaxially in an individualized section of conduit. The frustums are mounted substantially normal to the axis of the section and the direction of fluid flow and with their peripheries spaced symmetrically inward from the interior surface of the conduit section. Depending upon the dimensions of the displacement member relative to the internal diameter of the conduit, the displacement member is effective to linearize fluid flow over a range of flow rates through the section.

In some embodiments, the displacement member is made by joining two frustums together at their larger ends, usually by welding. The frustum facing in the upstream direction is customarily joined, e.g., by welding, at its upstream and smaller end to a pipe or tube which extends through the displacement member to its downstream face and through which a pressure reading is taken or through which a secondary fluid is introduced for mixing with a primary fluid flowing through the conduit. The pipe or tube is bent outwardly and extends through the wall of the conduit section upstream from the displacement member. The pipe or tube is joined, e.g., welded, to the wall of the conduit section and conveniently serves as the means for mounting the displacement member coaxially within the section.

In the embodiments above described, a separate flowmeter and its associated flow sensing devices are required for each of the various sizes of flowmeters needed for linearlizing and measuring fluid flows over respective ranges of flow rates.

U.S. Pat. No. 5,814,738 discloses an embodiment of the V-CONE device wherein the fluid flow displacement member is removeably and replaceably mounted in the downstream end of the conduit section so that a given displacement member can be removed and replaced by one or more different displacement members in order to accommodate different fluids and different ranges of fluid flow through the conduit section. In this way, a single section of conduit, i.e., a single meter body, can be used with a variety of displacement members to accommodate various liquids and gases and a broad range of flows through the meter body.

The latter embodiment of the device also provides flow measurement taps through the wall of the conduit section or meter body so that no measurement taps or other holes or passages are required in the displacement member. However, it has since been discovered that for some fluids, especially high velocity gases, measurement of the pressure at the downstream side of the displacement member by a tap in the conduit wall is not as accurate as the downstream measurements obtained with the earlier embodiments of the V-CONE device.

SUMMARY OF THE INVENTION

The object of the invention is to improve upon the devices disclosed in the above listed patents and the commercial embodiments of the V-CONE meters and fluid mixing and dispersing devices.

It is in particular an object of the invention to provide means for removeably and replaceably mounting displacement members in a conduit section for detachable connection with and disconnection from a pipe or tube that extends through the wall of the conduit and that communicates with an axial passage through the displacement member so that the advantages of replaceability and measurement at the axis of the downstream face of the displacement member are both attained.

In accordance with a preferred embodiment of the invention, a pipe or tube extending through and secured to the wall of the conduit includes a portion located substantially on the axis of the conduit section and extending in the downstream direction. A displacement member having a substantially axial bore or passage therethrough mates with the pipe or tube such that the pipe or tube is in fluid communication with the axis of the downstream face of the displacement member so that measurements can be taken from that point via the pipe or tube externally of the conduit section.

In a preferred embodiment, the end portion of the pipe or tube and the upstream end of the displacement member are provided with co-operable means for detachably securing the displacement member to the end portion of the pipe. The co-operable securing means may take any one or more of several known forms, such as mating screw threads, bayonet or J slot type quick connects, etc., provided they are absolutely reliable. It would not do to have a runaway displacement member carried downstream into a pump, compressor, or other expensive unit of equipment.

For that reason, preferred embodiments of the invention incorporate redundant securing systems.

The invention thus provides a fluid flow meter and mixing device having removable and replaceable displacement members and also providing for the taking of pressure measurements at optimal locations in the conduit.

These and other objects and advantages of the invention will become apparent to those of reasonable skill in the art from the following detailed description, as considered in conjunction with the accompanying drawings.

DETAILED DESCRIPTION OF PREFERRED EMBODIMENTS

The following is a detailed description of preferred embodiments of the invention presently contemplated by the inventors to be the best mode of carrying out the invention. Modifications and changes therein will become apparent to persons of reasonable skill in the art as the description proceeds.

Figure 1:
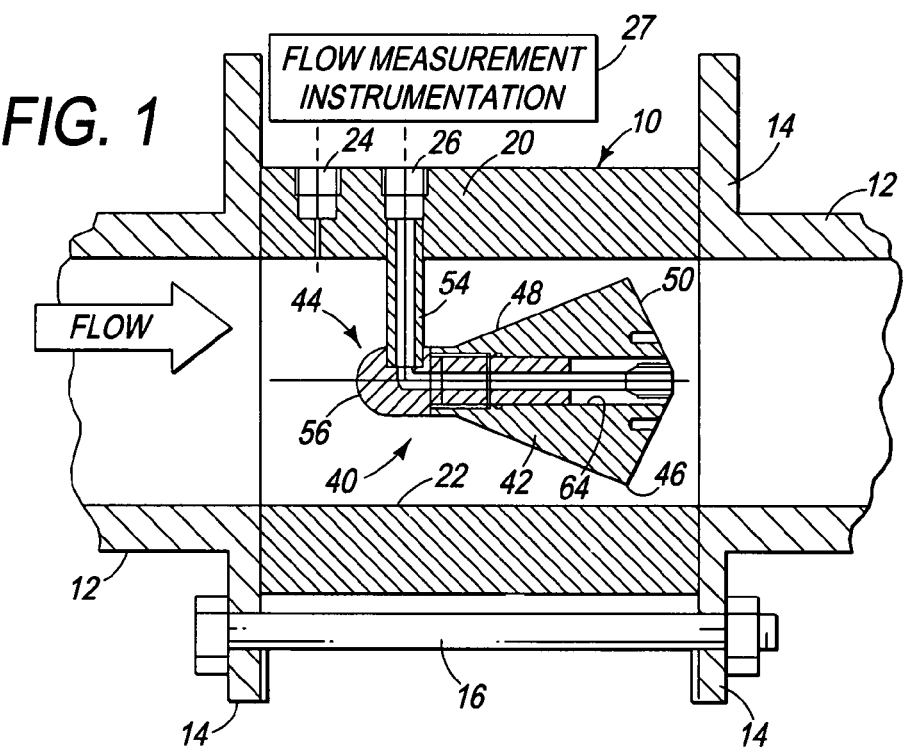
FIG. 1 is a longitudinal cross section of a first embodiment of the invention.

Referring to FIG. 1, a fluid flow meter of the invention, indicated generally at 10, is adapted to be installed in a pipeline or other fluid flow conduit which is depicted as being comprised of pipe sections 12 having bolting flanges 14 at their ends. The flow meter 10 is comprised of a meter body or conduit section 20 and a fluid flow displacement device 40 mounted coaxially within the body. The meter body 20 comprises, in essence, a section of pipe or conduit adapted to be bolted or otherwise secured between two sections of pipe, for example, between the flanges 14 of the illustrated pipe sections 12. The meter body illustrated, by way of example, is of the so called wafer design and is simply confined between the flanges 14 and centered or axially aligned with the pipe sections 12 by means of circumferentially spaced bolts 16 (only one shown) extending between and connecting the flanges. However, the conduit section 20 may be of any suitable pipe configuration, such as a flanged section or weld end section, etc.

The section 20 has an internal bore or through hole 22 which in use comprises a part of, and constitutes a continuation of the path of fluid flow through the pipeline 12. As indicated by the arrow, the direction of fluid flow is from left to right as viewed in the drawings. The pipeline 12 and conduit section 20 are usually cylindrical and the bore 22 is usually, though not always, of the same internal cross section and size as the pipe sections 12.

Longitudinally spaced flow measurement taps 24 and 26 extend radially through the body 20 at locations and for purposes to be described.

Figure 2:
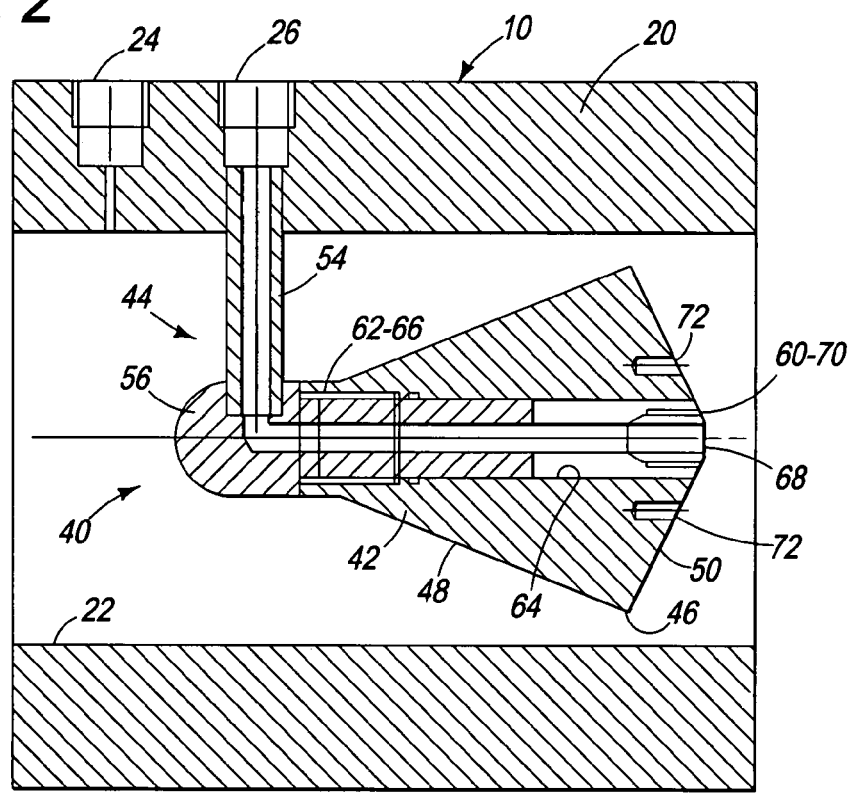
FIG. 2 is an enlarged cross sectional view of the fluid flow meter comprising the embodiment of FIG. 1.
Figure 3:
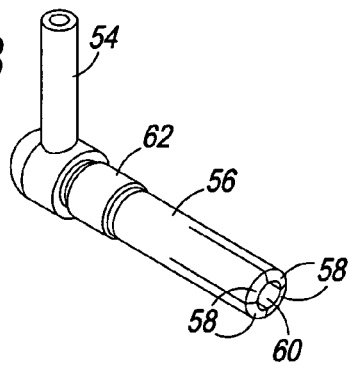
FIG. 3 is a perspective view of the displacement member mounting for the embodiment of FIG. 1.
Figure 4:
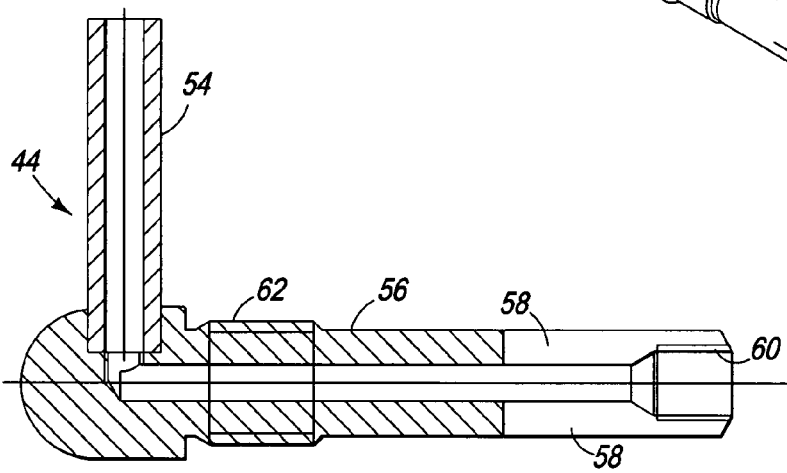
FIGS. 4 and 5 are cross sectional views of components of the displacement member mounting for the embodiment of FIG. 1.
Figure 5:
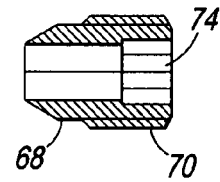

Referring to FIGS. 1 and 2, the displacement device 40 is comprised of a flow conditioning portion or displacement member 42 and a support or mount 44.

The flow conditioning or displacement member 42 is comprised of a body, usually cylindrical, which has a major transverse diameter or dimension at edge 46 and two oppositely facing, usually conical, sloped walls 48 and 50 which face, respectively, in the upstream and downstream directions in the meter body and which taper symmetrically inward toward the axis of the body. Except as hereinafter described, the flow conditioning member 42 has essentially the same physical characteristics and functions in essentially the same manner as the flow displacement members utilized in the "V-CONE" devices available from McCrometer Inc. and those described in U.S. Pat. Nos. 4,638,672, 4,812,049, 5,363,699 and 5,814,738, the disclosures of which are incorporated herein by reference, as though here set forth in full.

As described in the prior patents, the member 42 is of a smaller size than the bore 22 in the conduit 20 and is mounted coaxially within the bore normal to the direction of fluid flow and with the sloped walls 48 and 50 spaced symmetrically inward from the interior or inner surface of the wall of the conduit. The larger and contiguous ends of the sloped walls are of the same size and shape and define at their juncture a sharp peripheral edge 46, the plane of which lies normal to the direction of fluid flow. The upstream wall 48 is longer than the downstream wall 50 and preferably tapers inwardly to a small diameter at its upstream end. The wall is formed at an angle in the order from about 39° to about 75° to the plane defined by the peripheral edge 46, a preferred angle being in the order of about 67.5°. The angle of the downstream wall 50 relative to the plane defined by the edge 46 is within the range of from about 15° to about 30°, a preferred angle being in the order of about 26°. The beta ratio of the member 42 relative to the inner diameter of the conduit 20 may range from about 0.4 up to about 0.94.

As fluid enters the inlet or upstream end of the conduit 20, the fluid is displaced or deflected by the upstream wall 48 of the member 42 into an annular region of progressively decreasing cross-sectional area, to a minimum area at the plane of the peripheral edge 46. The fluid then flows into an annular region of progressively increasing area as defined by the downstream wall 50. As a consequence, fluid flow is stabilized and conditioned both upstream and downstream from the member 42. In particular, the member 42 is effective to linearize fluid flow in the region between the member 42 and the wall of the conduit 20 and to flatten the velocity profile of fluid flow in the conduit both upstream and downstream from the displacement member over a range of flow rates. Consequently, the flow profile both upstream and downstream is relatively flat, symmetrical, axially centered within the conduit, and of a large and essentially constant mean flow diameter irrespective of flow rate. Also, the fluid or fluids and any solid materials therein are homogenized so that the conduit 20 is filled with an essentially homogeneous mixture throughout substantially its full cross sectional area.

The downstream wall 50 is, in addition, effective to optimize the return velocity of the fluid as it returns to free stream conditions in the conduit downstream from the member. The sharp peripheral edge 46 in conjunction with the downstream wall 50 causes short vortices to be shed from the peripheral edge in the downstream direction. These vortices are of small amplitude and high frequency and thereby contribute to optimization of the return velocity of the fluid flow. Vortices of small amplitude and high frequency effectively eliminate extraneous downstream disturbances or so-called "noise" and thereby facilitate highly accurate and reliable measurements.

For purposes of replaceably mounting the displacement member 42 in the conduit section or meter body 20 with flow measurement at or substantially at the axis of the conduit and at or substantially at the downstream face of the displacement member, the preferred embodiment of the invention includes a mounting assembly 44 upstream of the displacement member to which the upstream end of the displacement member is detachably secured.

As shown in FIGS. 2-5, the assembly 44 comprises a pipe or tube made up of a tubular stem or sleeve 54 extending from the downstream flow measurement tap 26 radially into the conduit and a tubular guide pin 56 secured to the inner end of the sleeve 54 and extending along the axis of the conduit in the downstream direction. The guide pin 56 is of a length equal approximately to the length of the displacement member 42 and is split, by longitudinal slits, into four quadrants 58 at its downstream end. The downstream ends of the four quadrants have an internal thread 60 and the upstream end of the guide pin bears an external thread 62. The displacement member has an axial through passage 64 for conformable reception of the guide pin 56 and has an internal thread 66 at its upstream end for screw threaded mating engagement with the external thread 62 on the guide pin. Different displacement members may thus be attachably/detachably and interchangeably secured to the mounting assembly 44 simply by threading the same onto and off of the guide pin 56. For safety sake, the threads 62-66 are preferably of a self-locking type.

Additionally, in the preferred embodiment of the invention, the mounting assembly includes a second or redundant securing system, namely, the split downstream end 58 of the guide pin 56 and an associated tubular set screw 68. The set screw has a tapered upstream end and an external screw thread 70 adjacent its downstream end. The set screw is adapted to be threaded into the internal thread 60 at the downstream end of the guide pin whereupon the four guide pin quadrants 58 are biased outwardly into locking engagement with the wall of the passage through the displacement member. The displacement member is thus securely affixed to the guide pin so that it will not come loose during use and will not pose a threat to equipment located downstream from the fluid flow meter. For added precaution, the screw thread pairs 62-66 and 60-70 are preferably of opposite hand.

To facilitate screw threading and unthreading rotation thereof, the displacement member 42 has a pair of holes 72 in its downstream wall for reception of a tool (not shown) having a pair of dowel pins for mating engagement therein, and the set screw 68 has a hex socket 74 in its downstream face for reception of a hex wrench (not shown) engageable therein.

The upstream flow measurement tap 24 facilitates determination of one or more fluid flow conditions upstream from the edge 46 of the displacement member 42 and the downstream flow measurement tap 26, communicating via the tubular members 54, 56 and 68, facilitates determination of one or more fluid flow conditions axially of the conduit at the downstream face of the displacement member 42.

Figure 8:
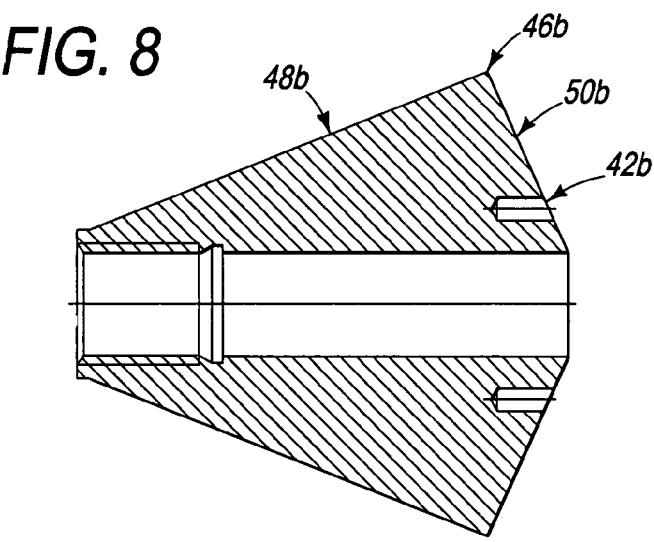
FIGS. 8, 9 and 10 are cross sectional views of three interchangeable displacement members for use in the same conduit, or conduits of equal inner diameter, and each having relative to the conduit different beta ratios.
Figure 9:
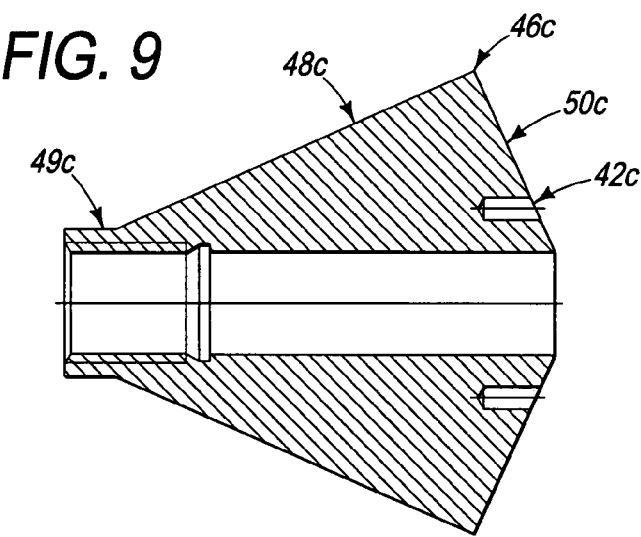
Figure 10:
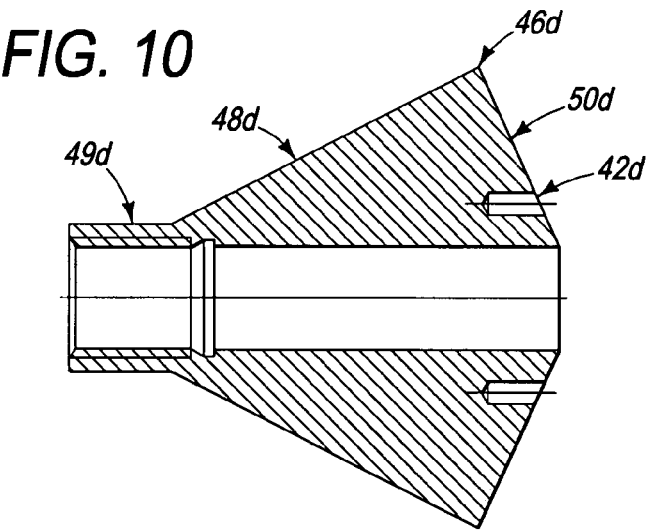

The displacement member 42 is readily attachable to and detachable from the guide pin 56 and interchangeable with other displacement members of different sizes and/or different configurations to accommodate measurement of fluid flow through the meter body 20 of different fluids and different flow rates and to facilitate use in the meter body of displacement members having different beta ratios, for example, the three different displacement members illustrated in FIGS. 8, 9 and 10.

The two measurement taps 24 and 26 are connected with suitable flow measurement instrumentation 27 known in the art in order to provide a read out of the flow characteristics desired to be determined.

Figure 6:
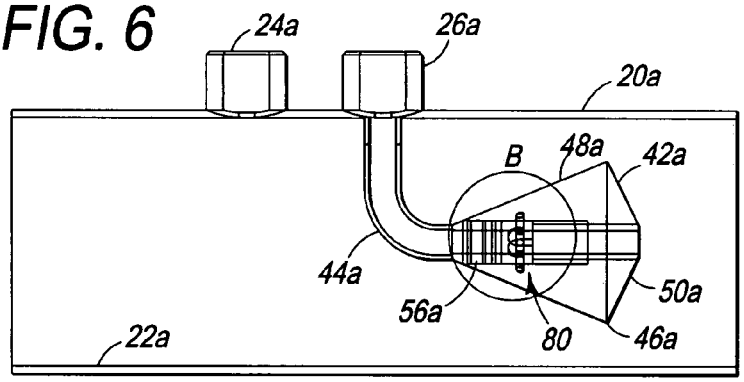
FIG. 6 is a longitudinal sectional view of a second embodiment of the invention.
Figure 7:
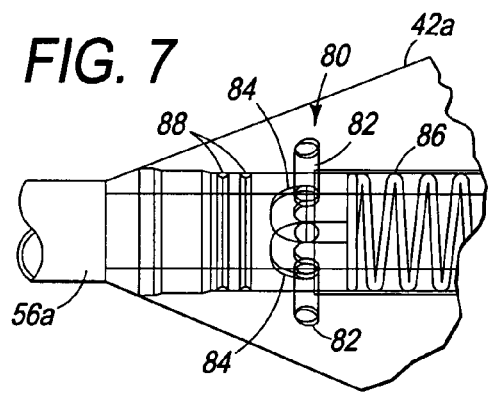
FIG. 7 is a sectional view of the portion of FIG. 6 encircled at "B" and illustrating the displacement member mounting for the embodiment of FIG. 6.

Referring to FIGS. 6 and 7, a second embodiment of the invention is shown as comprising a pipe section 20a having longitudinally spaced radial flow measurement taps 24a and 26a, a tube or pipe 44a secured at one end, as by welding, to the downstream tap 26a and curved in the downstream direction to terminate in an axially extending guide 56a, and a displacement member 42a attachably and detachably mounted on the guide 56a. In this embodiment, interchangeable displacement members 42a are attachable to and detachable from the guide 56a by a quick connect/quick disconnect device indicated generally at 80. Except for the device 80, reference numerals employed in FIGS. 6 and 7 are the same as those employed in FIGS. 1-5 with the added suffix "a".

The device 80 comprises a plurality of pins 82 secured to the displacement member and extending radially into the central passage or bore 64a of the displacement member, a corresponding number of bayonet or J slots 84 in the guide 56a releaseably receiving the pins, and a spring 86 within the bore 64a biasing the displacement member away from the guide so that the pins 82 normally remain seated in the lower terminus of the J slots, as shown in FIG. 7, to secure the displacement member to the guide. Fluid flow also holds the pins in the terminus of the J-slots.

To remove or detach the displacement member from the guide, it is only necessary to push the displacement member in the upstream direction to unseat the pins from the lower terminus of the J slots, to twist the displacement member a short distance in the permitted direction and to let the spring 86 separate the pins from the guides via the open upper ends of the J slots. The same or a different displacement member may be attached to the guide by reversing the recited steps.

Preferably, the guide includes a pair of axially spaced O-rings 88 or similar seals for sealing the displacement member to the guide.

The detachable mounting of the displacement member 42, 42a to the guide pipe or tube 44, 44a is highly advantageous in terms of the manufacture of fluid flow meters and mixing devices, in that standardized manufacturing procedures can be utilized to produce conduit sections and meter bodies of various standard diameters and displacement members of various standard diameters, configurations and beta ratios so that meters and mixers meeting individual specifications can be quickly and economically assembled from standard, in-stock, off-the-shelf components rather then being made to order. All components are produced with geometric similarity and certain constants, such as the spacing of the measurement taps 24, 26 and 24a, 26a, and the spacing of the beta edge 46, 46a from the measurement tap 26, 26a that communicates with the downstream face of the displacement member. By virtue of standardization and maintenance of geometric similarity and constants, it may no longer be necessary to test each and every meter or mixer, as has been the case with made to order meters and mixers.

FIGS. 8, 9 and 10 illustrate, by way of example, three representative displacement members 42b, 42c and 42d, intended for use in a conduit of a given diameter, each providing a different beta ratio within the conduit, and all providing for the same spacing of the beta edge 46b, 46c and 46d from the respective measurement tap.

The displacement member of FIG. 8 has a relatively large diameter beta edge 46b providing, for a certain conduit inner diameter, a beta ratio of 0.45.

The displacement member of FIG. 9 has an edge 46c of intermediate diameter providing, in a conduit of the same inner diameter, a beta ratio of 0.55. The smaller diameter of the edge 46c results in shortening of the upstream sloped wall 48c in comparison to the wall 48b. To maintain uniform spacing of the edge 46c from the respective measurement tap, the displacement member 42c of FIG. 9 includes at its upstream end a cylindrical extension 49c of a length such that the overall length of the displacement member 42c is the same as that of displacement member 42b, and the beta edge 46c is spaced the same distance from the measurement tap as is the beta edge 46b.

The displacement member 42d illustrated in FIG. 10 has a relatively small diameter beta edge 46d providing within a conduit of the same inner diameter, a beta ratio of 0.65. To maintain constant the overall length of the displacement member and the spacing of the beta edge from the measurement tap, the displacement member 42d has at its upstream end a cylindrical extension 49d of greater length then the extension 49c of the FIG. 9 displacement member.

By maintaining geometric similarity and certain constants, and practicing standardized manufacturing procedures, a single meter body 20 and its associated measurement instrumentation 27 can be adapted to different purposes and to perform different functions by appropriate selection, for example, of one or the other of the displacement members illustrated in FIGS. 8, 9 and 10, as well as other displacement members.

The displacement member mounting or support system of the invention facilitates convenient and quick conversion of the device from a first beta ratio to another beta ratio or from a first range of flow rates to other and different ranges of flow rates. Specifically, the size and/or configuration, e.g., slope angles, of the displacement member relative to the bore 22 in the section 20 determines the beta ratio, the type of fluids and the range of flows over which the displacement member is effective to linearize fluid flow through the region between the displacement member and the interior surface of the wall of the conduit. Changes in the size and/or configuration of the displacement member changes the type and ranges of flows to which the system is responsive. Consequently, by removing a first displacement member and replacing it with a different displacement member, the system can be rendered accurately responsive to different flow rates and different fluids and fluid mixtures. By virtue of the invention, this can be accomplished simply and expeditiously by removing the section 20 from the pipeline, removing the displacement member from the guide 56 or 56a and the conduit section 20, replacing the displacement member with a different displacement member, and returning the section 20 to its place in the pipeline 12. Consequently, there is no need to replace a given meter body with an entirely different meter body. One conduit section 20 and its associated sensors will suffice for purposes of measuring fluid flow over a number of ranges of flow rates and a number of different fluids, liquids, gases and mixtures thereof.

The objects of the invention have therefore been shown to be attained in a convenient, practical, economical and facile manner.

While presently preferred embodiments of the invention have been herein illustrated and described, it is to be appreciated that various changes, rearrangements and modifications may be made therein without departing from the scope of the invention as defined by the appended claims.

What is claimed is:

1. A fluid flow apparatus comprising, in combination,
    a conduit including a removable and replaceable section having a peripheral wall with an interior surface for conveying fluid therethrough in a given direction, said conduit section having relative to the direction of fluid flow an upstream end and a downstream end,
    a fluid flow displacement member in said conduit section having in relation to the direction of fluid flow an upstream end and downstream end, said displacement member being of smaller size than said section and having between the ends thereof sloped wall means forming a periphery on said member for deflecting the fluid to flow through a region defined between the periphery of said displacement member and the interior surface of said section,
    a tube extending through the wall of said conduit section and having a portion extending substantially axially of said section in the downstream direction,
    said displacement member having a substantially axial passage therethrough mating with said portion of said tube such that fluid communication is established between the exterior of said conduit section and a location at or adjacent the axis of said conduit section at or adjacent to the downstream end of said displacement member,
    cooperative means for removeably and replaceably mounting said displacement member in said section whereby said displacement member may be removed and replaced by a different displacement member to accommodate a different range of flows through said section;
    said cooperative means being located between said portion of said tube and said displacement member;
    a first coupling member on said portion of said tube; and
    a second mating coupling member within said axial passage in said displacement member, said first and second coupling members inter-engaging with one another to secure said displacement member to said tube.

2. The fluid flow apparatus as set forth in claim 1, said tube comprising a first measurement tap at the exterior of said conduit section, and a second measurement tap extending through the wall of said conduit section upstream of said displacement member, said taps accommodating measurement of fluid flow within said conduit in areas upstream and downstream of said displacement member.

3. The fluid flow apparatus as set forth in claim 2 including flow sensing means associated with said conduit section and said taps and constituting therewith a meter body, said displacement member being replaceable by a different displacement member to measure different fluids and different ranges of flows using a single meter body.

4. The fluid flow apparatus as set forth in claim 2, the second one of said taps communicating with an area in said conduit upstream of the displacement member where the velocity profile of fluid flow is relatively flat, and flow measurement means external to said conduit communicating with the interior of said conduit via said measurement taps.

5. The fluid flow apparatus as set forth in claim 1 wherein said first and second coupling members are mating screw threads on said portion of said tube and said displacement member.

6. The fluid flow apparatus as set forth in claim 1 wherein said first and second coupling members respectively include a mating slot and pin quick connect/disconnect.

7. A fluid flow apparatus comprising, in combination, a conduit having a peripheral wall with an interior surface for conveying fluid therethrough in a given direction, comprising:
    a fluid flow displacement member in said conduit having in relation to the direction of fluid flow an upstream end and a downstream end, said member being of smaller size than said conduit and having sloped wall means forming a periphery on said member for deflecting the fluid to flow through a region defined by the periphery of said displacement member and the interior surface of said conduit,
    a flow measurement tap extending through the wall of said conduit and communicating with an area within the conduit upstream of the displacement member,
    a tube extending through the wall of said conduit and including a portion extending in the downstream direction substantially axially of said conduit,
    said displacement member having a passage substantially axially therethrough and being attachably and detachably coupled to said portion of said tube, said tube and said passage comprising a measurement tap communicating between an area external of the conduit and an area within the conduit located at or adjacent the axis of the conduit at or adjacent the downstream end of the displacement member, and cooperative means for attachably and detachably coupling the displacement member with said portion of said tube;

said cooperative means being located between said portion of said tube and said displacement member and comprising a first connector on said tube and a second cooperative connector on said displacement member.

8. The fluid flow apparatus as set forth in claim 7 wherein said cooperative means comprises mating screw threads on said portion of said tube and said displacement member.

9. A fluid flow apparatus comprising, in combination, a conduit having a peripheral wall with an interior surface for conveying fluids therethrough in a given direction, said conduit having relative to the direction of fluid flow an upstream end and a downstream end, a fluid flow displacement member in said conduit having in relation to the direction of fluid flow an upstream end and a downstream end, said displacement member being of smaller size than said conduit and having between the ends thereof sloped wall means forming a periphery on said member for deflecting the fluid to flow through a region defined between the periphery of said displacement member and the interior surface of said conduit, a tube extending through the wall of said conduit and having a portion extending substantially axially of said conduit in the downstream direction, said displacement member having a substantially axial passage therethrough mating with said portion of said tube such that fluid communication is established between the exterior of said conduit and a location at or adjacent the axis of said conduit at or adjacent the downstream end of said displacement member, and cooperative means for removeably and replaceably mounting said displacement member on said tube, said displacement member is replaceable with a different displacement member to accommodate a different range of flows through said conduit;

said cooperative means comprising an axial tubular extension including said portion of said tube and extending through the axial passage in said displacement member from the upstream end thereof to adjacent the downstream end thereof, said extension having a split downstream end and a screw thread in said end, and a tapered threaded plug threaded into said screw thread and threadable therein for expanding the split end of said extension into locked engagement with the interior of said displacement member.

10. The fluid flow apparatus as set forth in claim 9 wherein said cooperative means comprises mating screw threads on said portion of said tube and said displacement member.

11. The fluid flow apparatus as set forth in claim 9 wherein said cooperative means further comprises mating screw threads within the upstream end of the displacement member and on the contiguous portion of the tubular extension.

12. A fluid flow apparatus comprising, in combination, a conduit including a removable and replaceable section having a peripheral wall with an interior surface for conveying fluid therethrough in a given direction, said conduit section having relative to the direction of fluid flow an upstream end and a downstream end, a fluid flow displacement member in said conduit section having in relation to the direction of fluid flow an upstream end and downstream end, said displacement member being of smaller size than said section and having between the ends thereof sloped wall means forming a periphery on said member for deflecting the fluid to flow through a region defined between the periphery of said displacement member and the interior surface of said section, a tube extending through the wall of said conduit section and having a portion extending substantially axially of said section in the downstream direction, said displacement member having a substantially axial passage therethrough mating with said portion of said tube such that fluid communication is established between the exterior of said conduit section and a location at or adjacent the axis of said conduit section at or adjacent to the downstream end of said displacement member, and cooperative means for removeably and replaceably mounting said displacement member in said section, said displacement member being replaceable with a different displacement member to accommodate a different range of flows through said section;

said cooperative means being located between said portion of said tube and said displacement member and comprising an axial tubular extension comprising said portion of said tube and extending through the axial passage in said displacement member from the upstream end thereof to adjacent the downstream end thereof, said extension having a split downstream end and a screw thread in said end, and a tapered threaded plug threaded into said screw thread and threadable therein for expanding the split end of said extension into locked engagement with the interior of the displacement member.

13. The fluid flow apparatus as set forth in claim 12 wherein said cooperative means further comprises mating screw threads within the upstream end of the displacement member and on the contiguous portion of the tubular extension.

14. The fluid flow apparatus as set forth in claim 13 wherein the screw threads between said tapered plug and said extension and between said displacement member and said extension are of opposite hands.

15. A fluid flow apparatus comprising, in combination, a conduit for conveying fluid therethrough in a given direction, said conduit having a peripheral wall with an interior surface, a fluid flow displacement member in said conduit having in relation to the direction of fluid flow an upstream end and a downstream end, said member being of smaller size than said conduit and having sloped wall means forming a periphery on said member for deflecting the fluid to flow through a region defined by the periphery of said displacement member and the interior surface of said conduit, a flow measurement tap extending through the wall of said conduit and communicating with an area within the conduit upstream of the displacement member, a tube extending through the wall of said conduit and including a portion extending in the downstream direction sub substantially axially of said conduit, said displacement member having a passage substantially axially therethrough and being attachably and detachably coupled to said portion of said tube, said tube and said passage comprising a measurement tap communicating between an area external of the conduit and an area within the conduit located at or adjacent the axis of the conduit at or adjacent the downstream end of the displacement member, and cooperative means for attachably and detachably coupling the displacement member with said portion of said tube;

said cooperative means being located between said portion of said tube and said displacement member and comprising an axial tubular extension comprising said portion of said tube and extending through the axial passage in said displacement member from the upstream end thereof to adjacent the downstream end thereof, said extension having a split downstream end and a screw thread in said end, and a tapered threaded plug threaded into said screw thread and threadable therein for expanding the split end of said extension into locked engagement with the interior of said displacement member.

16. The fluid flow apparatus as set forth in claim 15 wherein said cooperative means further comprises mating screw threads within the upstream end of the displacement member and on the contiguous portion of the tubular extension.

17. The fluid flow apparatus as set forth in claim 16 wherein the screw threads between said tapered plug and said extension and between said displacement member and said extension are of opposite hands.

\* \* \* \* \*